9664X
C. P. LADD.
PLATFORM BALANCE.
Patented May 17, 1836.
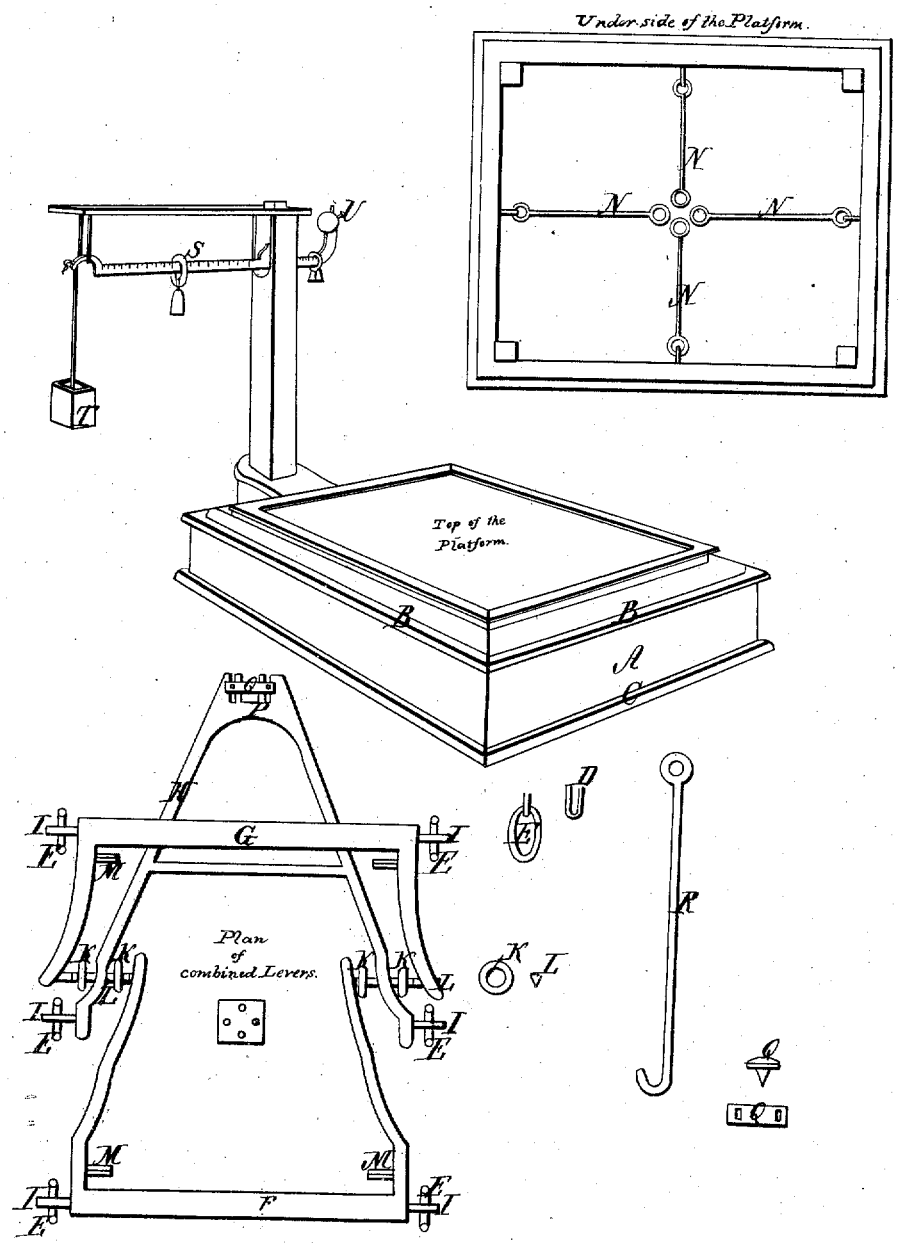

9664X  May 17, 1836  52.

Calvin P. Ladd of Searsburgh. Vermont.

Letters Patent.

The schedule referred to in these Letters Patent and making part of the same containing a description in the words of the said Calvin P. Ladd himself of his improvement in the platform Balance.

Be it known that I Calvin P. Ladd of Searsburgh in the county of [illegible] and State of Vermont, have made a new and useful improvement in the useful arts, being a Machine for weighing, called "Ladd's Improved Platform Balance," which is described as follows reference being had to the annexed drawings of the same, making part of this Specification.

This Balance consists of a rectangular frame A. of any convenient size and strength adapted to the purpose intended. On the top and bottom of this frame are cast iron frames B. & C. embracing the frame A. and secured to the same by screws. In the upper cast iron frame B. are left or drilled apertures to admit the [illegible] D. to which are suspended the loops E. made of an oval figure. In these loops are suspended the levers F. G. & H. by pivots I projecting from the side of the levers, these levers are connected together and suspended by rings K. and pivots L. which have heads or projections to prevent the rings from slipping off. The platform upon which the weight to be weighed is placed rests upon four pivots M. projecting from the inner side of the levers; the bearings on the underside of the platform, and which rest upon the pivots M. are faced with steel. Iron rods N. to keep the platform in its proper position and prevent its touching the sides of the frame, extended from the sides of the platform to the centre of the frame, where they are attached to pins or points O. which will prevent the platform from vibrating horizontally in any direction. The levers H. are brought together at P. where there is a moveable pivot Q. for adjusting the levers; this pivot is attached by screwbolts and nuts which may be adjusted by moving the bolts backward or forward, in oblong mortices in the ends of the levers as required. This pivot is suspended in a hook formed at the end of a vertical 9664x May 17, 1836 rod R. extending to the steelyard S. hang; in the usual manner. At the end
of the long arm of the Steelyard is suspended a box. T. containing weight for balan
cing the platform. At the short arm of the steelyard is an adjusting weight and
spring t. for balancing the platform to the utmost nicety.
The long arm of the Steelyard or lever is graduated to balance any required
weight in pounds &c. the short arm is graduated for determining the ounces &c.
Operation. The platform is first brought to an equilibrium by the
weighted box - ball and spring; the article to be weighed is then placed upon the
platform, which is suspended to the short end of the lever or Steelyard, by a
combination of levers of the second order, - the poise is then moved on the
long arm of the lever from the fulcrum towards the small end, which will
indicate the weight in pounds. the ounces being shown by the small poi.
on the short end of the lever which is moved towards the fulcrum
What I claim as my invention and which I desire to secure
by Letters Patent consists in the before described Balance for weighing Witness
Clement T. Coote.
William P. Elliot.

C. P. Ladd

[illegible]

616 [illegible]
700

Drawing